(12) United States Patent
Arnott

(10) Patent No.: US 8,560,414 B2
(45) Date of Patent: Oct. 15, 2013

(54) SYNTHETIC ULTRALONG INFLATION-PROTECTED SEPARATE TRADING OF REGISTERED INTEREST AND PRINCIPAL OF SECURITIES SYSTEM, METHOD AND COMPUTER PROGRAM PRODUCT

(75) Inventor: Robert D. Arnott, Newport Beach, CA (US)

(73) Assignee: Research Affiliates, LLC, Newport Beach, CA (US)

( * ) Notice: Subject to any disclaimer, the term of this patent is extended or adjusted under 35 U.S.C. 154(b) by 100 days.

(21) Appl. No.: 12/857,479

(22) Filed: Aug. 16, 2010

(65) Prior Publication Data
US 2010/0312719 A1 Dec. 9, 2010

Related U.S. Application Data

(63) Continuation-in-part of application No. 11/508,888, filed on Aug. 24, 2006, now Pat. No. 7,778,905, which is a continuation-in-part of application No. 11/050,458, filed on Feb. 4, 2005.

(60) Provisional application No. 60/541,677, filed on Feb. 4, 2004.

(51) Int. Cl.
*G06Q 40/00* (2012.01)

(52) U.S. Cl.
USPC .............................. 705/35; 705/36 R; 705/37

(58) Field of Classification Search
USPC ........................................... 705/35, 36 R, 37
See application file for complete search history.

(56) References Cited

U.S. PATENT DOCUMENTS

| 4,642,768 A | 2/1987 | Roberts |
| 4,648,038 A | 3/1987 | Roberts et al. |
| 4,722,055 A | 1/1988 | Roberts |

(Continued)

FOREIGN PATENT DOCUMENTS

| EP | 0 278 132 | 8/1988 |
| JP | A S63-245764 | 10/1988 |
| JP | A 2000-148875 | 5/2000 |

OTHER PUBLICATIONS

Rodolfo Apreda, The cash flow model with float: a new approach to deal with valuation and agency problems, Nov. 1999, Journal of applied economics, vol. 2, pp. 247-279.*

(Continued)

*Primary Examiner* — Hai Tran
(74) *Attorney, Agent, or Firm* — ATFirm PLLC; Ralph P. Albrecht

(57) ABSTRACT

A computer program product embodied on a computer readable medium may enable a computer processor to perform a method for generating a correlated investment. The method may include the steps of: discounting to present value one or more future liabilities at a discount rate of a bond that matures at the same time as the future liabilities; generating a correlated investment using an original investment amount and/or leverage funds; monitoring market information about a bond market and/or inflation using a computer; and recalibrating the correlated investment using the computer according to the market information and/or inflation, including: recommending at least one of buying or selling portions of the correlated investment securities and/or portfolio as indicated by the market and/or inflation information. The future liabilities may be of a duration greater than the duration of the longest available bond issued by an applicable sovereign.

17 Claims, 4 Drawing Sheets

(56) References Cited

U.S. PATENT DOCUMENTS

| | | | |
|---|---|---|---|
| 4,739,478 | A | 4/1988 | Roberts et al. |
| 4,752,877 | A | 6/1988 | Roberts et al. |
| 4,839,804 | A | 6/1989 | Roberts et al. |
| 5,126,936 | A | 6/1992 | Champion |
| 5,644,726 | A | 7/1997 | Oppenheimer |
| 5,671,358 | A | 9/1997 | Debe et al. |
| 5,742,775 | A | 4/1998 | King |
| 5,758,097 | A | 5/1998 | Debe et al. |
| 5,774,880 | A | 6/1998 | Ginsberg |
| 5,799,287 | A | 8/1998 | Dembo et al. |
| 5,812,988 | A | 9/1998 | Sandretto |
| 5,852,811 | A | 12/1998 | Atkins |
| 5,857,176 | A | 1/1999 | Ginsberg |
| 5,926,792 | A | 7/1999 | Koppes et al. |
| 5,983,206 | A | 11/1999 | Oppenheimer |
| 6,148,293 | A | 11/2000 | King |
| 6,167,384 | A | 12/2000 | Graff |
| 6,192,347 | B1 | 2/2001 | Graff |
| 6,263,321 | B1 | 7/2001 | Daughtery, III |
| 6,278,981 | B1 * | 8/2001 | Dembo et al. .............. 705/36 R |
| 6,292,830 | B1 | 9/2001 | Taylor et al. |
| 6,321,212 | B1 | 11/2001 | Lange |
| 6,332,132 | B1 | 12/2001 | Halpern |
| 6,336,103 | B1 | 1/2002 | Baker |
| 6,363,360 | B1 | 3/2002 | Madden |
| 6,381,585 | B1 | 4/2002 | Maples et al. |
| 6,578,016 | B1 | 6/2003 | Trankina et al. |
| 6,601,044 | B1 | 7/2003 | Wallman |
| 6,754,639 | B2 | 6/2004 | Ginsberg |
| 6,938,009 | B1 * | 8/2005 | Herbst et al. ................ 705/36 R |
| 6,988,081 | B2 | 1/2006 | Halpern |
| 7,024,384 | B2 | 4/2006 | Daughtery, III |
| 7,203,661 | B1 | 4/2007 | Graff |
| 7,778,905 | B2 | 8/2010 | Arnott |
| 2001/0056392 | A1 | 12/2001 | Daughtery, III |
| 2002/0019789 | A1 * | 2/2002 | Ginsberg ....................... 705/36 |
| 2002/0077955 | A1 | 6/2002 | Ramm |
| 2002/0107774 | A1 | 8/2002 | Henninger et al. |
| 2002/0147670 | A1 | 10/2002 | Lange |
| 2003/0055777 | A1 | 3/2003 | Ginsberg |
| 2003/0093347 | A1 | 5/2003 | Gray |
| 2003/0216932 | A1 | 11/2003 | Foley |
| 2004/0039667 | A1 | 2/2004 | Winklevoss et al. |
| 2004/0236661 | A1 * | 11/2004 | Benning ........................ 705/37 |
| 2005/0027645 | A1 | 2/2005 | Lui et al. |
| 2005/0187801 | A1 | 8/2005 | Phelps |
| 2005/0197944 | A1 | 9/2005 | Arnott |
| 2005/0234821 | A1 | 10/2005 | Benham et al. |
| 2006/0212380 | A1 * | 9/2006 | Williams et al. ................ 705/35 |
| 2007/0043643 | A1 | 2/2007 | Arnott |
| 2007/0100727 | A1 | 5/2007 | Multer et al. |

OTHER PUBLICATIONS

Final Office Action in U.S. Appl. No. 11/050,458.

Examiner's Report Dated Nov. 10, 2009 in Australian Patent Application No. 2005213425.

Office Action mailed Jun. 22, 2009 in U.S. Appl. No. 11/050,458.

International Preliminary Report on Patentability in PCT/US2005/003673, dated Jan. 2007, corresponding to Written Opinion and International Search Report previously submitted Nov. 9, 2006.

International Preliminary Examination Report in PCT/US2007/018595, dated Mar. 2009, corresponding to Written Opinion and International Search Report previously submitted Feb. 11, 2008.

Japanese Notice of Rejection in related JP Application 2006-552289 dated Dec. 7, 2010.

Supplementary European Search Report, of Nov. 2010 for EP 07837222.4 and communication under 70(2) and 70a(2) EPC dated Dec. 2010.

Supplementary European Search Report dated Aug. 2010 for EP 05722765.4.

Mexican Office Action from MX Application PA/a/2006/008873 dated Nov. 17, 2009.

First Office Action in Chinese Patent Application 200580004159.X/PCT/US2005/003673 dated Apr. 19, 2010.

Final Office Action in U.S. Appl. No. 11/508,888.

* cited by examiner

SYNTHETIC ULTRALONG INFLATION-PROTECTED SEPARATE TRADING OF REGISTERED INTEREST AND PRINCIPAL OF SECURITIES SYSTEM, METHOD AND COMPUTER PROGRAM PRODUCT

CROSS-REFERENCE TO RELATED APPLICATIONS

This application is a continuation-in-part of U.S. patent application Ser. No. 11/508,888, filed Aug. 24, 2006, issuing Aug. 17, 2010 as U.S. Pat. No. 7,778,905, which is a continuation-in-part of U.S. patent application Ser. No. 11/050,458, filed Feb. 4, 2005, which claims the benefit under Section 119(e) of U.S. patent application Ser. No. 60/541,677, filed Feb. 4, 2004, the contents of all of which are incorporated herein by reference in their entireties.

BACKGROUND OF THE INVENTION

1. Field of the Invention

This invention pertains generally to securities investing and more specifically to investment in bonds, interest-bearing securities, and/or related derivatives.

2. Related Art

A bond is an investment which may have two components: periodic interest payments and repayment of principal. The repayment of interest may be through coupons associated with the bond. The principal payment and interest payment of the bond may be separated and sold individually. A bond that is traded without its coupons is called a "zero-coupon bond." Separate trading of registered interest and principal of securities (STRIPS) refers to an instrument allowing an investor to hold and trade individual interest and principal components of bonds as separate securities. STRIPS are popular with investors who want to receive a known payment at a specific future date. For example, some State lotteries invest the present value of large lottery prizes in STRIPS to be sure that funds are available when needed to meet annual payment obligations that result from the prizes. Pension funds invest in STRIPS to match the payment flows of their assets with those of their liabilities to make benefit payments. STRIPS are also popular investments for individual retirement accounts, 401 (k)-type savings plans, and other income tax-advantaged accounts that permit earnings to accumulate without incurring immediate income tax consequences.

SUMMARY OF THE INVENTION

In accordance with an exemplary embodiment of the present invention, a computer system for generating a correlated investment may comprise a host processor adapted to discount to present value one or more future liabilities of any duration at a discount rate of a bond that matures at the same time as the future liabilities, where the future liability has a duration greater than the duration of the longest available bond issued by a sovereign. The host processor may be further adapted to generate a correlated investment using an original investment amount and leverage funds.

The host processor may be further adapted to monitor market information about a bond market by communicating with an exchange computer, and to recalibrate the correlated investment according to the market information.

The host processor may be further adapted to recalibrate the correlated investment comprising being adapted to at least one of buy and/or sell portions of the correlated investment as indicated by the market information.

The host processor may be further adapted to generate returns from the correlated investment, where the returns are greater than returns of a zero-coupon bond that matures at a same time as the one or more future liabilities.

In accordance with another exemplary embodiment of the present invention, a computer-implemented method for generating a correlated investment may comprise: discounting to present value one or more future liabilities of a duration greater than the longest available bond issued by a sovereign at a discount rate of a bond that matures at the same time as the one or more future liabilities; generating a correlated investment using an original investment amount and leverage funds; monitoring market information about a bond market using a computer; and recalibrating the correlated investment using the computer according to the market information comprising: recommending at least one of buying or selling portions of the correlated investment as indicated by the market information.

The computer-implemented method may further comprise generating returns from the correlated investment, where the returns are greater than returns of a zero-coupon bond that matures at a same time as the one or more future liabilities.

In accordance with another exemplary embodiment of the present invention, a computer-implemented method for generating a correlated investment may comprise: aligning a net asset value of a correlated investment with a present value of a future liability comprising matching a duration of the correlated investment to a duration of the future liability, where the duration of the future liability is greater than the duration of the longest available bond issued by a sovereign; and changing the net asset value of the correlated investment in a highly correlated manner with a change in the present value of the future liability.

The computer-implemented method may further comprise generating returns from the correlated investment, where the returns are greater than returns of a zero-coupon bond that matures at a same time as completion of the duration of the future liability.

The computer-implemented method may further comprise changing by monitoring market information; and recalibrating the correlated investment based on the market information.

The future liability may comprise a stream of one or more future liabilities.

The computer-implemented method may further comprise aligning by discounting a future value of the future liability to a present value using a discount rate. The discounting may be by a rate equal to a yield of a zero-coupon Treasury bond, the Treasury bond maturing at a same time as the future liability.

In accordance with another exemplary embodiment of the present invention, a computer program product embodied on a computer readable media, the product adapted to enable a computer processor to perform a method for generating a correlated investment, the method may comprise: discounting to present value one or more future liabilities at a discount rate of a bond that matures at the same time as the one or more future liabilities, the one or more future liabilities of a duration greater than the duration of the longest available bond issued by a sovereign; generating a correlated investment using an original investment amount and leverage funds; monitoring market information about a bond market using a computer; and recalibrating the correlated investment using the computer according to the market information comprising: recommending at least one of buying or selling portions of the correlated investment as indicated by the market information.

The method may further comprise: generating returns from the correlated investment, where the returns are greater than returns of a zero-coupon bond that matures at a same time as completion of the duration of the future liability.

The method may further comprise changing by monitoring market information; and recalibrating the correlated investment based on the market information.

The future liability may comprise a stream of one or more future liabilities.

The method may further comprise aligning by discounting a future value of the future liability to a present value using a discount rate. The discount rate may comprise a yield of a zero-coupon Treasury bond, the Treasury bond maturing at a same time as the future liability.

In accordance with another exemplary embodiment of the present invention, a system for generating a correlated investment may comprise: means for discounting to present value one or more future liabilities at a discount rate of a bond that matures at the same time as the one or more future liabilities, the one or more future liabilities of a duration greater than the duration of the longest available bond issued by a sovereign; means for generating a correlated investment using an original investment amount and leverage funds; means for monitoring market information about a bond market using a computer; and means for recalibrating the correlated investment using the computer according to the market information comprising: means for recommending at least one of buying or selling portions of the correlated investment as indicated by the market information.

In accordance with another exemplary embodiment of the present invention, a system adapted to generate a correlated investment may comprise: a host computer adapted to discount to present value one or more future liabilities at a discount rate of a bond that matures at the same time as the one or more future liabilities, the one or more future liabilities of a duration greater than the duration of the longest available bond issued by a sovereign, to generate a correlated investment using an original investment amount and leverage funds, to monitor market information about a bond market, to recalibrate the correlated investment according to the market information, by being adapted to at least one of buy or sell portions of the correlated investment as indicated by the market information.

The duration of the liability may exceed the longest available STRIPS bond issued by any applicable sovereign.

The applicable sovereign may comprise at least one of a National Treasury, U.S. Treasury, a state, a county, a city, a town, and/or a municipality.

According to one exemplary embodiment, securities or investments in an exemplary portfolio may include, e.g., but not limited to, Treasury Inflation Protected Securities (TIPS), or other sovereign inflation linked securities. According to one exemplary embodiment, securities can be nominal, or inflation adjusted for a given country, such as, e.g., but not limited to, US, or other sovereign entities. According to an exemplary embodiment, securities may be national inflation-adjusted, or U.S. inflation-adjusted. Exemplary securities may include inflation-adjusted U.S. treasuries, or inflation-adjusted national treasury bonds.

In accordance with another exemplary embodiment of the present invention, a computer implemented method of generating a correlated investment for a future liability of a duration greater than a duration of a longest conventional bond, may comprise: discounting to present value via a processor a future liability having a duration greater than the duration of the longest available bond issued by a sovereign; and purchasing an investment comprising at least one of an interest bearing security, and/or a derivative, the investment having a duration less than that of the future liability, but being purchased in a sufficient multiple so that the multiplicative product of the duration of the investment and the multiple, equals the duration of the future liability.

In accordance with another exemplary embodiment of the present invention, a computer implemented method may comprise: matching a duration of a liability with a bond or a portfolio of bonds having the same duration as the duration of the liability, where the duration of the liability is longer than the longest available STRIPS bond.

In accordance with another exemplary embodiment of the present invention, a computer implemented method may comprise: defeasing a liability using one or more fixed income instruments whose duration matches the duration of the liability, where a duration of the one or more fixed income instruments exceeds the duration of the longest duration available STRIPS bond.

BRIEF DESCRIPTION OF THE DRAWINGS

The foregoing and other features and advantages of the invention will be apparent from the following, more particular description of exemplary embodiments of the invention, as illustrated in the accompanying drawings. In the drawings, like reference numbers generally indicate identical, functionally similar, and/or structurally similar elements. The drawing in which an element first appears is indicated by the leftmost digits in the corresponding reference number. A exemplary embodiment is discussed below in the detailed description of the following drawings.

DETAILED DESCRIPTION OF EXEMPLARY EMBODIMENTS OF THE INVENTION

Various exemplary embodiments of the invention are discussed in detail below including a preferred embodiment. While specific implementations are discussed, it should be understood that this is done for illustration purposes only. A person skilled in the relevant art can recognize that other components and configurations may be used without parting from the spirit and scope of the invention.

Figure 1:
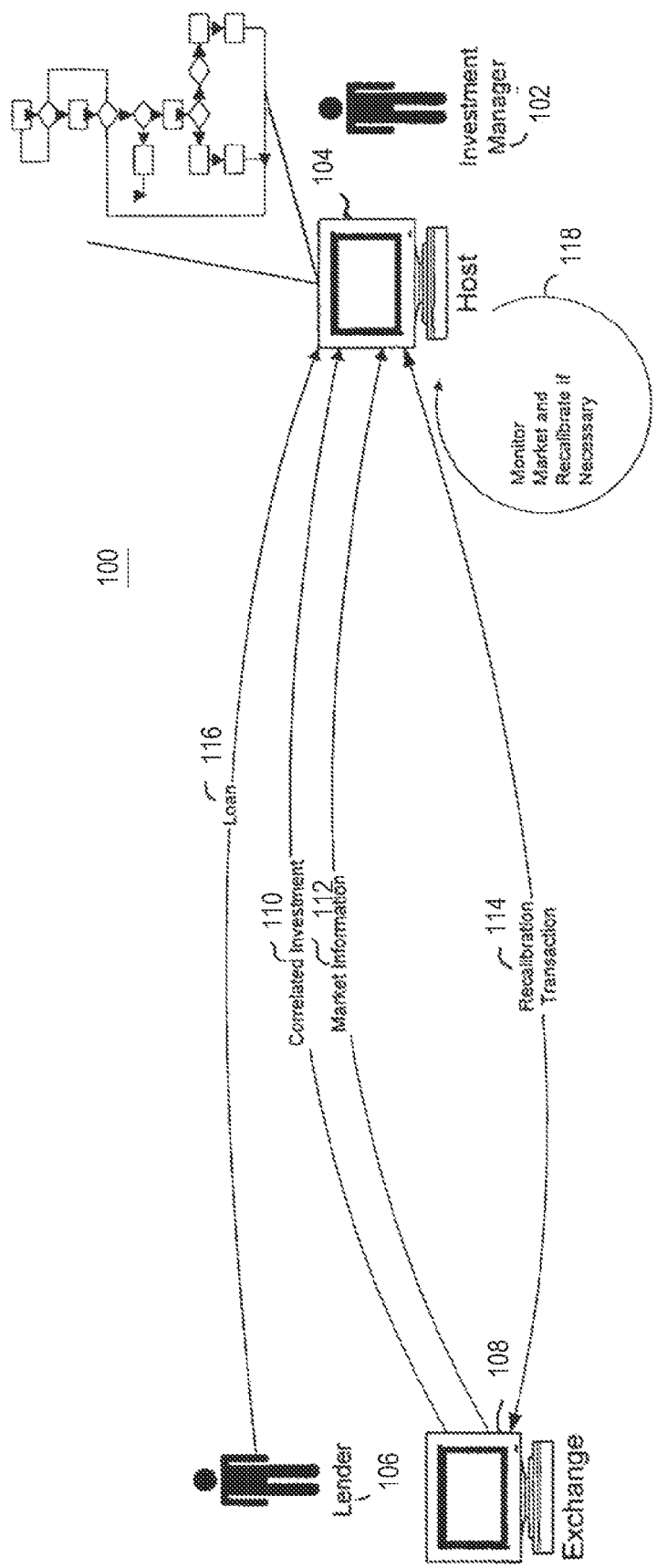
FIG. 1 is a collaboration diagram of a correlated investment system in accordance with an exemplary embodiment of the present invention.

FIG. 1 is a collaboration diagram 100 of a correlated investment system in accordance with an exemplary embodiment of the present invention. An investment manager 102 may generate a correlated investment 110 with the aid of a computer system. In an exemplary embodiment, the investment manager 102 may use a host workstation 104 in communication with a lender 106 and an exchange 108. To generate the correlated investment 110, according to an exemplary embodiment, the investment manager 102 may determine a net asset value of the correlated investment 110 and may align the net asset value with a present value of a future liability. As the net asset value of the correlated investment 110 is aligned to the present value of the future liability, the net asset value of the correlated investment 110 may change in a highly correlated manner with changes in the present value of the future liability. Investment market information 112, may be generated by a securities exchange 108 or other similar market, and may be used to determine the present value of the future liability, such as, e.g., but not limited to, a bond.

The difficulty in applying this investment strategy may include maintaining a high degree of correlation between the present value of the future liability and the correlated net asset value of the correlated investment 110. To implement the strategy, a particular investment may be chosen that has the same duration as a future liability.

Figure 2:
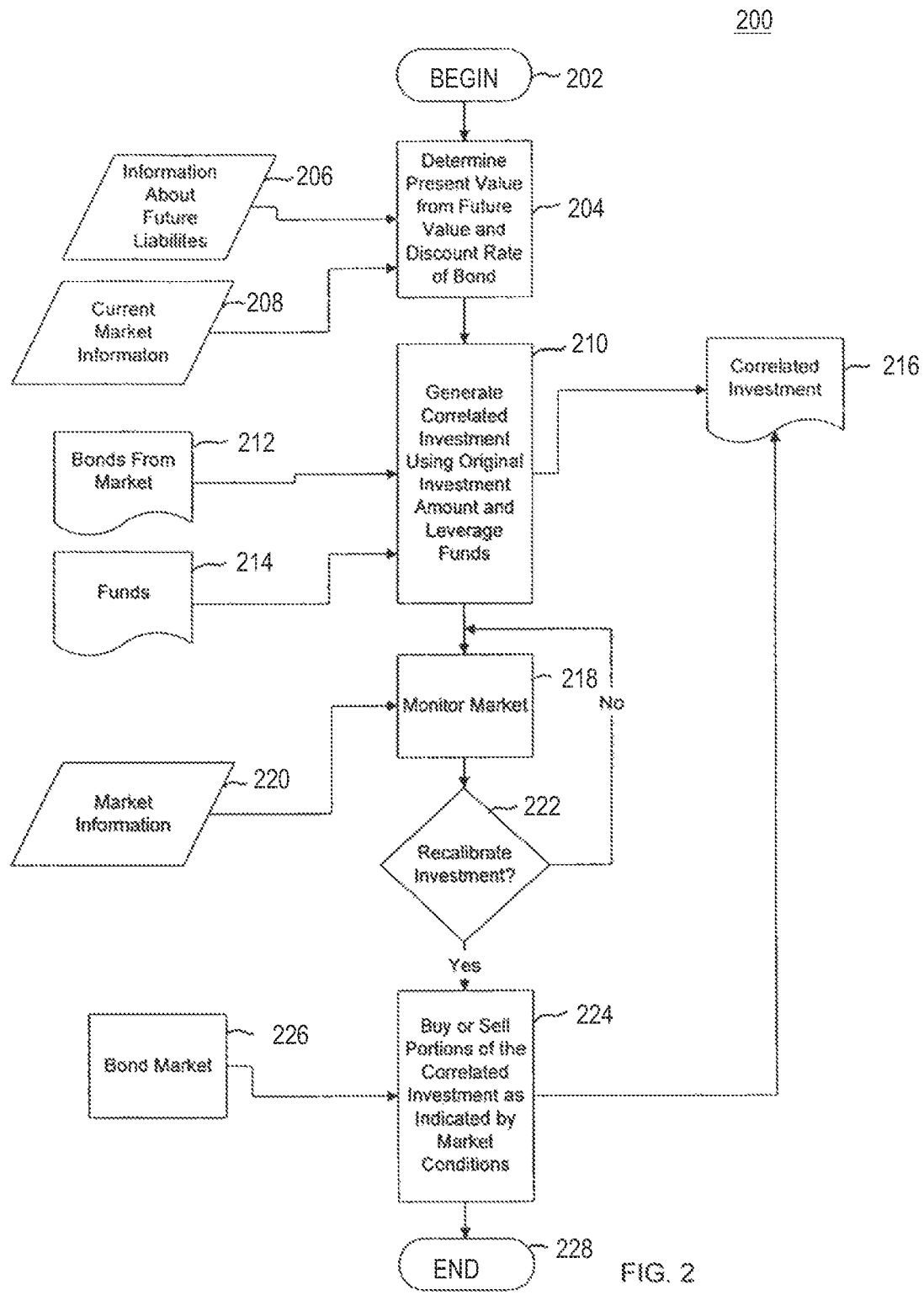
FIG. 2 is a process flow diagram of a correlated investment process in accordance with an exemplary embodiment of the present invention.

Referring now to FIG. 2 and FIG. 1, in the present invention, the goal of obtaining an investment having the same duration as a future liability may be accomplished by using a correlated investment 110, which may include a futures contract on a zero-coupon Treasury bond. FIG. 2 depicts a flow diagram 200, beginning with 202 and continuing immediately with 204 in an exemplary embodiment. In operation, in 204 the present value of a stream of future liabilities may be determined by discounting the future value of the future liabilities to a present value. The discount rate used to calculate the present value may be the yield of a zero-coupon Treasury bond which matures at substantially the same time that the future liabilities are due, as determined from future liability information 206. As such, the present value of the future liabilities will change with the yield on the matched zero-coupon Treasury bond. The yield of the zero-coupon Treasury bond may be determined from current bond market information 208. According to one exemplary embodiment, an inflation-adjusted bond may be used, such as, e.g., but not limited to, a U.S. Treasury Inflation Protected Securities (TIPS).

To maintain the correlation with changes in the present value of the future liabilities, the futures contracts may be on zero-coupon Treasury bonds 212 of shorter duration than that of the future liabilities, but may be in greater amounts than the present value of the future liability. For example, in an exemplary embodiment, if the duration of a future liability is 20 years, a correlated investment 216 may be generated in 210 and could include, e.g., but not limited to, futures contracts on two 10-year zero-coupon Treasury bonds of the same face value. As the yield of the matched zero-coupon Treasury bond changes, the net asset value of the futures contracts may change at the same time and in the same direction, thus maintaining high correlation with the zero-coupon Treasury bond and therefore also maintaining high correlation with the present value of the future liability.

Since the correlated investment 216 has a shorter duration than the intended longer term investment, the correlated investment 216 may have a reduced change in value for a given change in yield of the zero-coupon Treasury bond. This means that the futures contracts should have a total present value amount larger than the present value of the future liability in order to match the rate of change of the intended longer term investment. To accomplish this, the correlated investment 216 may be leveraged by borrowing funds 214 to pay for the increased present value amount. Thus, in an exemplary embodiment, a loan 116 may be obtained from a lender 106, as shown in FIG. 1. In addition, the leveraged correlated investment may generate returns that are greater than the returns of a zero-coupon bond that matures at the same time the future liability is due.

For the investment to work properly, the present value of the correlated investment 216 may be, as shown in 218, monitored constantly by monitoring market information 220 about the bond market preferably a real-time computing system 300 may be used. As shown in FIG. 1, in an exemplary embodiment, market information 112 from exchange 108 may be accessed at host 104, and one or more recalibration transactions 114 may be undertaken. As shown in 118, the market may be monitored and recalibrated as necessary. If the present value changes significantly, as indicated in the futures markets by monitoring 218 market information 220, the investment may be easily recalibrated 220 as the correlated investment is very liquid. If it is determined in 222 that the investment is to be recalibrated, then in 224 portions of the correlated investment 216 may be bought or sold as indicated by market conditions as observed from the bond market 226. The market may be monitored 218 and recalibrated 220 as necessary.

The present invention can be used over a range of possible matched and semi-matched duration and leverage values. For example, in an exemplary embodiment, using the invention an investor may purchase a 20-year zero-coupon Treasury bond as the proxy for a 20 year future liability. Alternatively, in another exemplary embodiment, futures contracts on zero-coupon Treasury bonds of 15 years duration could also be purchased with a leverage factor of 1.33 to 1.

In addition to zero-coupon Treasury bonds this method of investment can use other securities and synthetic securities such as, e.g., but not limited to, separate trading of registered interest and principal of securities ("STRIPS"), treasury inflation protected securities (TIPS), inflation-adjusted securities, promissory notes, loans, etc. In addition to bond futures of all types the present invention may be applied to other futures contracts that are related to interest rates or to interest-bearing securities. In addition, the invention may be applied to any future commitment situation, whether the commitment is specific or approximate as to amount and date. According to an exemplary embodiment, synthetic investments may be created, according to an exemplary embodiment, which may be ultralong in duration, i.e., longer in duration than a longest duration of conventionally available bond, available from an applicable sovereign. According to an exemplary embodiment, a security, or a portfolio of securities may be selected so as to match in duration, a duration of a long duration liability, so as to be available to satisfy, or substantially satisfy an obligation of the long duration liability. According to an exemplary embodiment, the system and method may be configured to track effective yields generated from said security or portfolio, where the effective yields may be positive, and may be greater than an effective yield of a zero-coupon bond having a maximum available maturity, where the maturity is a maturity closest to a maturity of the long duration liability.

Liability Matching

One of the biggest challenges confronting pensions and endowments is managing the gap between the value and behavior of assets and liabilities. This problem may be particularly critical for liabilities with long maturities (durations).

This dilemma may arise from the different interest-rate sensitivity of assets and liabilities; especially if assets and liabilities are in different asset classes (e.g., a pension invests in equities but has liabilities that may behave like bonds). When interest rates change, the value of assets and liabilities may diverge, creating either a surplus or a shortfall in assets available to fund liabilities.

Using a combination of separately traded interest and principal (STRIPS), bills, and bonds, according to an exemplary embodiment, proprietary investment strategies may be geared to match asset term with the duration of long term liabilities such as, e.g., but not limited to, liabilities of duration in excess of the longest available bond, i.e., 26, 30, or whatever duration is the maximum duration in years of the longest bond made available by the relevant sovereign. Matching the interest rate sensitivity of assets with the duration of liabilities, in an exemplary embodiment, may insulate pension plans from the maturity/duration gap risk. In an exemplary embodiment, this matching of long duration liabilities may be referred to as long duration STRIPS such as, e.g., synthetic STRIPS™.

The greatest interest rate risk for pension or endowment assets may lie with the longest maturity liabilities. A small amount of money or a small percentage of the total net present value (NPV) of liabilities can be used in an exemplary embodiment to eliminate a proportionately larger percentage of interest rate risk in a pension or endowment portfolio.

For example, for the liabilities held by an actual corporate pension plan, a mere 10% of the NPV of the plan's total liabilities can be used to eliminate 25% of the interest rate risk of the plan's total liabilities according to an exemplary embodiment. The defeasement strategy, according to an exemplary embodiment, may use a disproportionately small percentage of assets of a pension or endowment to eliminate a proportionately larger percentage of liability risk.

The actual present value of a future liability may be determined by discounting the liability amount back to the present value using a yield (i.e., a current return percentage) of a bond with no coupon payments (such as, e.g., but not limited to, a STRIP, or a Zero-coupon bond) whose years to maturity is the same as the years to the date the liability comes due. In bond language the duration of the bond is the same as the duration of the liability. A liability can be "defeased" by matching the liability with, e.g., but not limited to, a bond or a portfolio of bonds, whose duration is the same as that of the liability. Both will change identically with changes in interest rates so that the net asset value of the bond or portfolio remains the same as the present value of the liability. Both may increase or decrease in value, at times dramatically, but they will remain of equal value through interest rate changes. By a bond, or portfolio of bonds with the same duration as that of a liability and in the amount of the present value of that liability assures that the portfolio will grow to the amount of the liability on the date it is due and that the portfolio will remain matched to the present value of the liability no matter how the amount of the present value changes as interest rates change over time.

According to an exemplary embodiment of the present invention, a system, method, or computer program may be operatively adapted to generate a correlated investment. In an exemplary embodiment, the system may include, a host computer, which may be adapted to discount to present value one or more future liabilities at a discount rate of a bond that matures at the same time as said one or more future liabilities, where the one or more future liabilities are of a duration greater than a the longest available bond. The host computer may be adapted to generate a correlated investment using an original investment amount and leverage funds. The host computer may also be adapted to monitor market information about a bond market, and to recalibrate the correlated investment according to the market information, by being adapted to buy portions, and/or sell portions, (buy, sell, or a combination of both) of the correlated investment as indicated by the market information. In an exemplary embodiment, the system may further include a system where the duration of the liability exceeds the longest available STRIPS bond issued by any applicable sovereign. In an exemplary embodiment, an applicable sovereign may include a national treasury such as, e.g., but not limited to, the U.S. Treasury, the Japanese Treasury, the Treasury of the United Kingdom, the German Treasury, any other national treasury, etc. In another exemplary embodiment, the applicable sovereign may include, a state, a county, a city, a town, a municipality, or any other entity which may issue a bond such as, e.g., but not limited to, any level of government, or other entity.

In an exemplary embodiment, an exemplary purpose of a long duration defeasement (LDD), such as, e.g., a Research Affiliates Defeasement LP (RAD™), may be to match a duration of liabilities that may come due further out than the longest zero coupon Treasury bonds. To do this, an LDD, such as, e.g., the RAD™, starts with a portfolio of long Treasury bonds and then may add an appropriate amount of Treasury bond futures and/or Treasury bill futures to extend the duration of the portfolio to match the target liabilities. Usually the notional amount of futures may exceed the present value of the liabilities. A result of this duration extension is that the portfolio may garner appreciable alpha over the benchmark much of the time.

LDDs, such as, e.g., RAD™, may be a poor investment in absolute return space but may be an excellent investment for long liability space. The objective in the event of a long duration liability is not high absolute returns, but rather to minimize liability risk. Fortuitously, the LDD approach just happens to generate alpha as well according to an exemplary embodiment.

Liability risk in an exemplary embodiment is the volatility of the present value of a liability. Volatility in an exemplary embodiment is the relative rate at which the price of a security moves up and down. Volatility in an exemplary embodiment may be calculated by determining the annualized standard deviation of daily changes in price. If a price moves up and down rapidly over short periods of time, it may have high volatility. If the price does not change, it may have low volatility. Liability risk may be driven by changes in interest rates.

A LDD, such as, e.g. RAD™, may enable a defined benefit (DB) pension plan to reduce liability risk. A defined benefit pension plan may have essentially assumed a short position on a long-duration liability. LDDs, such as, e.g., RAD™, may create an asset whose duration is very close to that of the long-duration liability and whose present value correlates closely to the present value of the liability. For example, the longest 10% of liabilities (measured by present value) typically drive 25% to more than 40% of total liability risk. By investing 10% of assets in a LDD, such as, e.g., RAD™, portfolio for those longest liabilities, overall liability risk may be reduced by 25% to more than 40%.

Liability risk for a DB pension plan is one side of the asset/liability pair. Reductions in liability risk may directly result in a reduction of the risk that a gap will open, or widen, between assets and liabilities according to an exemplary embodiment.

Up to a very large number of LDDs may be managed together in an exemplary embodiment. The investment framework for each may be the same, as may be most of the underlying securities. Different combinations of Treasury bond and Treasury bill futures may be used to match the different durations. The holdings in a RAD™ for liabilities with a weighted duration of 35 years may not be materially different from those for liabilities with duration of 33 years. Once the challenge of managing a single RAD™ is met, it may not be materially more difficult to manage many more.

The benchmark may be decided by mutual agreement with the client and may usually be the yield of the longest dated Treasury bond in an exemplary embodiment. The longest duration Treasury bond yield may be used because i) it is a real, not theoretical, benchmark, and ii) it is independently available. To this benchmark may be added 25 basis points (bps), an exemplary administrative fee. This fee must be recovered on behalf of the client through positive performance before the provider/manager may earn any incentive fees.

When there is an inverted yield curve, there may be no way to take advantage of a flat or inverted yield curve, so it is not attempted. The portfolio defensively may hold the longest Treasury bonds available and may wait out this temporary condition.

In terms of capacity in the market place, long bond futures presently are a sub-market of $50 to $100 billion. Five billion US dollars worth of these futures would make one a major participant in this sub-market. For the exemplary LDD, RAD™, somewhere above $5 billion but probably under $10 billion, if all executed about the same time, trades may begin to impact this sub-market. The $5 billion may be the amount of futures contracts, not the notional amount, according to an exemplary embodiment.

For a LDD, the yield from the longest Treasury bond times 90%, plus the yield from short-term T-notes times 10%, is the return of the underlying portfolio, according to an exemplary embodiment. Add to this return the leveraged return from the Treasury bond or Treasury note futures used to lengthen duration, minus the cost of borrowing for the futures, and the result may be the current LDD return in an exemplary embodiment.

All of the securities in the portfolio—Treasury bonds, Treasury bills, Treasury notes, and Treasury bond futures—are highly liquid and readily sellable. A LDD such as, e.g., RAD™ can be unwound quickly if necessary. There is no 'lock up' needed.

The same single investment vehicle or portfolio can be used for more than one RAD™, whether in succession or with overlap. One may therefore pay off one bond and put another bond into an existing LDD.

The RAD™ portfolio is invested to match the duration of the obligation it defeases, according to an exemplary embodiment. As years pass and the duration of the obligation decreases, the duration of the RAD™ is reduced to stay matched in an exemplary embodiment. Absolute volatility, tracking error versus the obligation, and the need for futures to match duration all diminish as the due date approaches.

When the due date arrives, the LDD such as, e.g., RAD™ portfolio will surely have the amount needed to meet the obligation, plus the alpha generated over the years. Prior to the obligation due date, the amount of accumulated alpha can be calculated and taken out of the LDD RAD™ in an exemplary embodiment.

In an exemplary embodiment, each bond may get its own LDD. Alternatively, several bonds may be combined into one LDD. It may be more cost effective to use a single investment vehicle or portfolio for multiple LDDs. LDDs of different duration may largely comprise the same underlying securities (the longest Treasury bond may be the same regardless of the duration of the obligation and LDD or RAD™.)

A very large number of LDDs or RADs can be managed by a single entity. The investment framework for each LDD is the same, as are most of the underlying securities. Different combinations of Treasury bond and Treasury bill futures may be used to match different durations. The holdings in a LDD or RAD for a 35-year obligation are not materially different from those for a 33-year obligation. Once the challenge of managing a single LDD or RAD is met, it is not materially more difficult to manage many more.

Treasury Inflation Protected Securities (TIPS) include a treasury security that may be indexed to inflation in order to protect investors from negative effects of inflation. Conventional U.S. Treasury TIPS are considered an extremely low-risk investment since they are backed by the U.S. government and since their par value rises with inflation, as measured by the Consumer Price Index (CPI), while their interest rate remains fixed. Interest on TIPS is conventionally paid semi-annually. TIPS can be purchased directly from the government through the Treasury Direct system in $100 increments with a minimum investment of $100 and are conventionally available with only 5-, 10-, and 20-year maturities.

According to an exemplary embodiment, a security may be adjusted for changes in inflation, over time, such as, e.g., but not limited to, quarterly, semiannually, annually, etc.

Securities according to exemplary embodiments of the present invention, may be held in one or more portfolios, which may include, e.g., but are not limited to, a fund, a hedge fund, a pension fund, a mutual fund, an exchange traded fund, a retirement fund, an educational fund, and/or a fund of funds, etc., and may include at least a portion of an interest in a taxable account, a non-taxable account, and/or a separately managed account, etc.

According to one exemplary embodiment, a synthetic inflation-adjusted security may be created, managed and tracked according to an exemplary embodiment. According to another exemplary embodiment, inflation-adjusted securities may be used in creating a synthetic security. An exemplary, but non-limiting inflation-adjusted security includes treasury inflation protected securities (TIPS). Treasury Inflation-Protected Securities (TIPS) are inflation-indexed bonds issued by the U.S. Treasury. The principal of a TIPS bond is adjusted to the Consumer Price Index (CPI), the commonly used measure of inflation. The coupon rate is constant, but generates a different amount of interest when multiplied by the inflation-adjusted principal, thus protecting the holder against inflation. TIPS are currently offered in 5-year, 10-year and 30-year maturities. Thus, exemplary embodiments of the present invention may create synthetic securities that exceed in duration the duration of a 30-year maturity TIPS bond. Thus, should one desire to create, according to an exemplary embodiment, a synthetic security designed to substantially satisfy an obligation of a duration that exceeds the longest available duration bond from an applicable sovereign, e.g., 40 year duration liability, and the longest available duration TIPS bond has a duration of approximately 30 years in duration, then a synthetic instrument, security or portfolio may be created that matches the 40-year duration of the liability.

According to an exemplary embodiment, a plurality of computing devices may be used, which may be coupled to one another via a network, each of said plurality of computing devices may include a processor and a memory coupled to the processor, as well as input/output devices and communications subsystems for interfacing with the communications network. The plurality of computing devices may perform separate or combinations of the steps performed by the applicant's various exemplary embodiments of the invention, including, e.g., tracking a value of a given security, monitoring a value, tracking inflation, adjusting a value of a synthetic security or portfolio of securities, in accordance with inflation, tracking a value of a portfolio, and tracking the long duration liability to monitor the value of the obligation relating to the long duration liability, and tracking the valuation of the portfolio of securities, comparing the values of the tracked valuations, adjusting component securities of the portfolio, modifying the portfolios so as to match the portfolios value to the liability, storing and/or retrieving values tracked and/or calculated onto storage devices, outputting onto computer displays values in textual, numeric, graphical and/or audio and/or visual form. One or more computing devices may be used in combination to perform the steps of the exemplary embodiments. The exemplary computing devices may include one or more processors that may execute software so as to perform the steps of the process.

Figure 3:
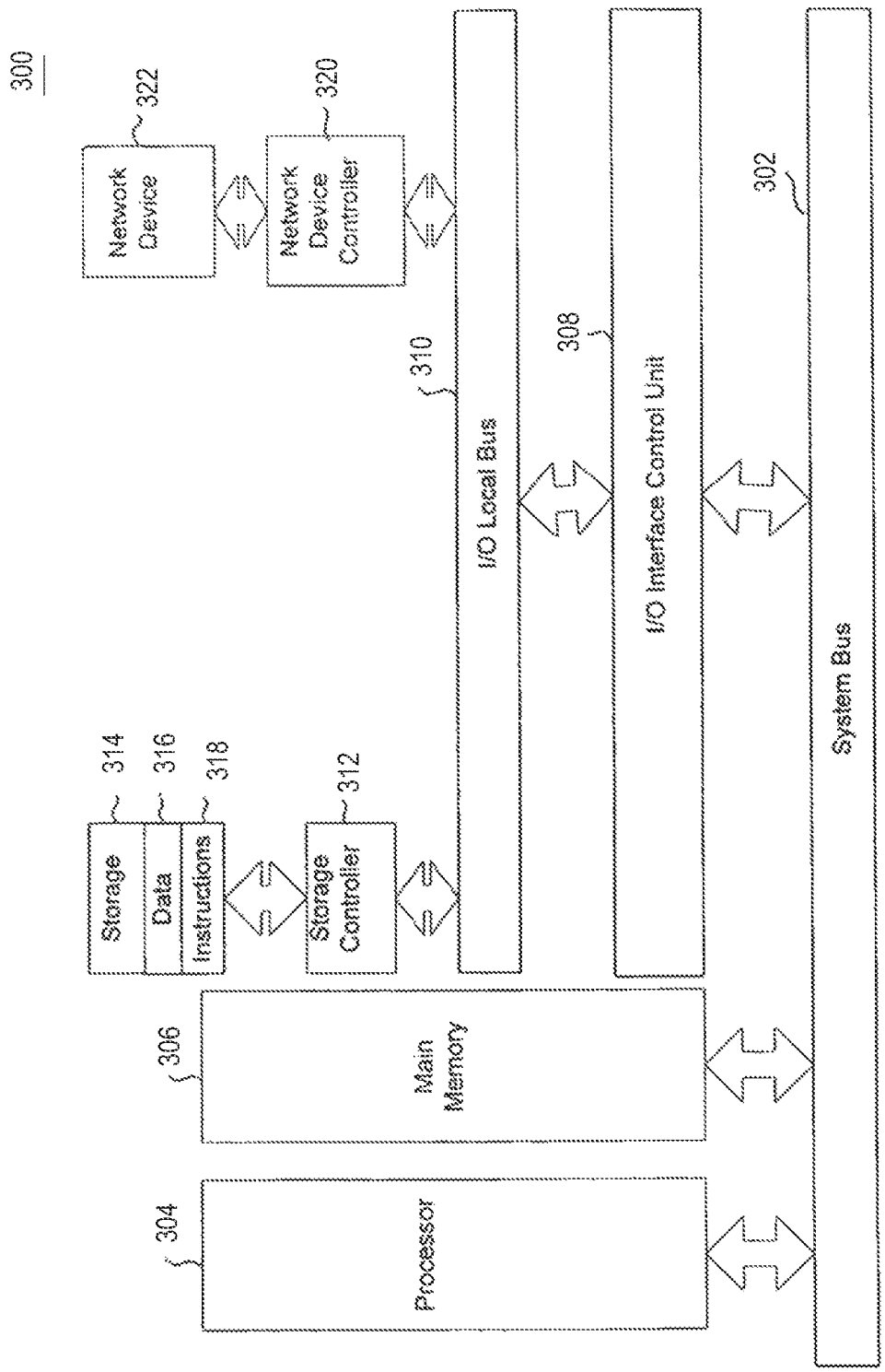
FIG. 3 is a block diagram of a host suitable for hosting a correlated investment system in accordance with an exemplary embodiment of the present invention.
Figure 4:
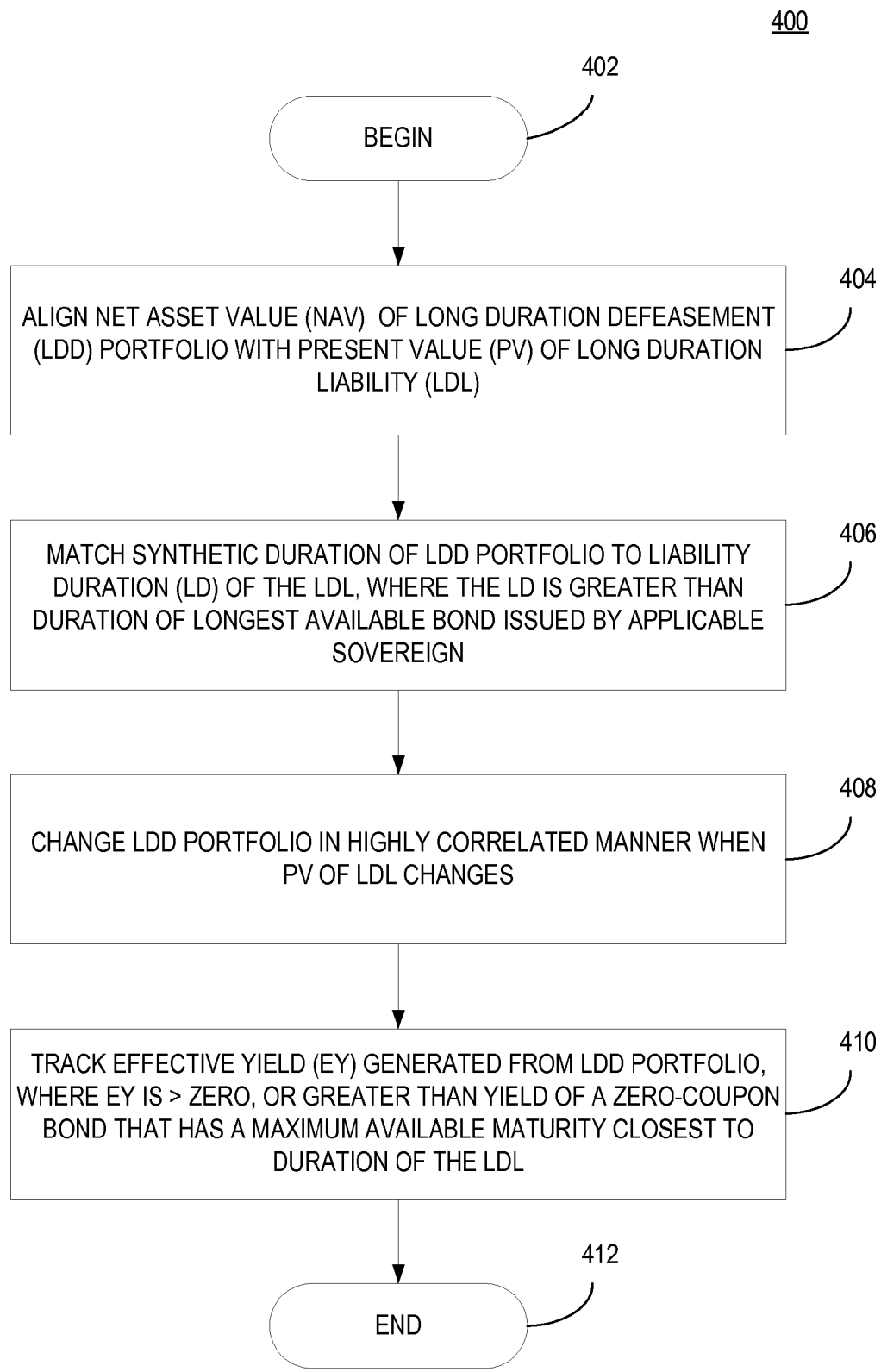
FIG. 4 is a flow diagram of in accordance with an exemplary embodiment of the present invention.

FIG. 3 is a block diagram 300 of a data processing apparatus suitable for hosting a correlated investment system 104 in accordance with an exemplary embodiment of the present invention. The data processing apparatus includes a processor 304 operably coupled to a main memory 306 by a system bus 302. The process may load programming instructions into the main memory 306. The programming instructions are executable by the processor 304 to implement the features of a correlated investment system as described herein.

The processor 304 may further be coupled to a storage device 314 through an Input/Output (I/O) control unit 308, an I/O local bus 310, and a storage device controller 312. The storage device may be used to store the programming instructions 318 and any data 316 used by the processor 304 to implement the features of a correlated investment system.

The processor 304 may further be coupled to a network device 322 via the Input/Output (I/O) control unit 308, the I/O local bus 310, and a communications device controller 320. The processor 304 may then communicate with other data processing systems, such as a data processing system 108 used to transmit bond market information or receive securities purchase requests, as desired to implement the features of a correlated investment system as described herein.

An exemplary embodiment of the invention may be implemented on computing device(s), processor(s) 304, computer(s) and/or communications device(s).

The computer, in an exemplary embodiment, may comprise one or more central processing units (CPUs) or processors, which may be coupled to a bus 302. The processor 304 may, e.g., access main memory 306 via the bus 302. The computer may be coupled to an input/output (I/O) subsystem 308 such as, e.g., but not limited to, a network interface (I/F) card (NIC) 322, or a modem for access to a network. The computer may also be coupled to a secondary memory 314 via I/O I/F 308 directly via bus (not shown), or via a main memory 306, for example. Secondary memory 314 may include, e.g., but not limited to, a disk storage unit or other storage medium. Exemplary disk storage units 314 may include, but are not limited to, a magnetic storage device such as, e.g., a hard disk, an optical storage device such as, e.g., a write once read many (WORM) drive, or a compact disc (CD), digital versatile disc (DVR), or a magneto optical device. Another type of secondary memory may include a removable disk storage device, which may be used in conjunction with a removable storage medium, such as, e.g. a CD-ROM, DVD-ROM, or a floppy diskette. In general, the disk storage unit may store an application program for operating the computer system referred to commonly as an operating system. The disk storage unit may also store documents of a database (not shown). The computer may interact with the I/O subsystems and disk storage unit via bus. The bus may also be coupled to a display for output, and input devices such as, but not limited to, a keyboard and a mouse or other pointing/selection device.

In this document, the terms "computer program medium" and "computer readable medium" may be used to generally refer to media such as, e.g., but not limited to removable storage drive, a hard disk installed in hard disk drive, and signals, etc. These computer program products may provide software to computer system. The invention may be directed to such computer program products.

References to "one embodiment," "an embodiment," "example embodiment," "various embodiments," etc., may indicate that the embodiment(s) of the invention so described may include a particular feature, structure, or characteristic, but not every embodiment necessarily includes the particular feature, structure, or characteristic. Further, repeated use of the phrase "in one embodiment," or "in an exemplary embodiment," do not necessarily refer to the same embodiment, although they may.

In the following description and claims, the terms "coupled" and "connected," along with their derivatives, may be used. It should be understood that these terms are not intended as synonyms for each other. Rather, in particular embodiments, "connected" may be used to indicate that two or more elements are in direct physical or electrical contact with each other. "Coupled" may mean that two or more elements are in direct physical or electrical contact. However, "coupled" may also mean that two or more elements are not in direct contact with each other, but yet still co-operate or interact with each other.

An algorithm is here, and generally, considered to be a self-consistent sequence of acts or operations leading to a desired result. These include physical manipulations of physical quantities. Usually, though not necessarily, these quantities take the form of electrical or magnetic signals capable of being stored, transferred, combined, compared, and otherwise manipulated. It has proven convenient at times, principally for reasons of common usage, to refer to these signals as bits, values, elements, symbols, characters, terms, numbers or the like. It should be understood, however, that all of these and similar terms are to be associated with the appropriate physical quantities and are merely convenient labels applied to these quantities.

Unless specifically stated otherwise, as apparent from the following discussions, it is appreciated that throughout the specification discussions utilizing terms such as "processing," "computing," "calculating," "determining," or the like, refer to the action and/or processes of a computer or computing system, or similar electronic computing device, that manipulate and/or transform data represented as physical, such as electronic, quantities within the computing system's registers and/or memories into other data similarly represented as physical quantities within the computing system's memories, registers or other such information storage, transmission or display devices.

In a similar manner, the term "processor" may refer to any device or portion of a device that processes electronic data from registers and/or memory to transform that electronic data into other electronic data that may be stored in registers and/or memory. A "computing platform" may comprise one or more processors.

Embodiments of the present invention may include apparatuses for performing the operations herein. An apparatus may be specially constructed for the desired purposes, or it may comprise a general purpose device selectively activated or reconfigured by a program stored in the device.

While various embodiments of the present invention have been described above, it should be understood that they have been presented by way of example only, and not limitation. Thus, the breadth and scope of the present invention should not be limited by any of the above-described exemplary embodiments, but should be defined only in accordance with the following claims and their equivalents. While this invention has been particularly described and illustrated with reference to a preferred embodiment, it will be understood to those having ordinary skill in the art that changes in the above description or illustrations may be made with respect to formal detail without departing from the spirit and scope of the invention.

What is claimed is:

1. A computer-implemented method for maintaining a long duration defeasement portfolio, the method comprising:
   maintaining, by at least one computer, the long duration defeasement portfolio comprising;
      aligning, by the at least one computer, a net asset value of the long duration defeasement portfolio with a present value of a long duration liability comprising:
         matching a synthetic duration of said long duration defeasement portfolio to a liability duration of a long duration liability, wherein said liability duration of said long duration liability is greater than a duration of a longest available bond issued by an applicable sovereign; and
         changing, by the at least one computer, said long duration defeasement portfolio in a highly correlated manner when the present value of said long duration liability changes; and
      tracking, by the at least one computer, effective yields generated from said long duration defeasement portfolio, wherein said effective yields are at least one of greater than zero, or greater than effective yields of a zero-coupon bond that has a maximum available maturity closest to the duration of said long duration liability.

2. The method according to claim 1, wherein said changing comprises:
   monitoring market information, by the at least one computer, to determine whether to adjust said long duration defeasement portfolio; and adjusting, by the at least one computer, said long duration defeasement portfolio based on said market information and said determination whether to adjust.

3. The method according to claim 1, wherein said long duration liability comprises a stream of one or more future liabilities.

4. The method according to claim 1, wherein said aligning comprises:
   discounting, by the at least one computer, a future value of said long duration liability to a present value using a discount rate.

5. The method according to claim 4, wherein said discounting by said discount rate comprises discounting, by the at least one computer, by a rate equal to a yield of a zero-coupon Treasury bond, said zero-coupon Treasury bond maturing at a time substantially near a maturity of said long duration liability.

6. A computer implemented method of maintaining a long duration defeasement portfolio for a long duration liability of a duration greater than a duration of a longest conventional bond, comprising:
   determining, by at least one processor, a liability duration of at least one long duration liability, wherein the liability duration is greater than a duration of the longest available bond issued by an applicable sovereign; and
   selecting, by the at least one processor, at least one investment to include in the long duration defeasement portfolio, the investment comprising at least one of an interest bearing security, or a derivative, said investment having a duration less than the liability duration of the long duration liability, but being purchased in a sufficient multiple so that the multiplicative product of said duration of said investment and said multiple, equals said liability duration of said long duration liability;
   maintaining, by at least one computer, the long duration defeasement portfolio comprising:
      aligning, by the at least one computer, a net asset value of the long duration defeasement portfolio with a present value of a long duration liability comprising:
         matching, by the at least one computer, a synthetic duration of said long duration defeasement portfolio to a liability duration of a long duration liability, wherein said liability duration of said long duration liability is greater than a duration of a longest available bond issued by an applicable sovereign; and
         changing, by the at least one computer, said long duration defeasement portfolio in a highly correlated manner when the present value of said long duration liability changes; and
      tracking, by the at least one processor, effective yields generated from the long duration defeasement portfolio, wherein said effective yields are at least one of greater than zero, or greater than effective yields of a zero-coupon bond that has a maximum available maturity closest to a maturity of the at least one long duration liability.

7. The method according to claim 6, wherein said liability duration of said long duration liability exceeds the longest available separate trading of registered interest and principal of securities bond issued by an applicable sovereign.

8. The method according to claim 7, wherein said applicable sovereign comprises at least one of a National Treasury, U.S. Treasury, a state, a county, a city, a town, or a municipality.

9. A computer implemented method of maintaining a long duration defeasement portfolio comprising:
   maintaining, by at least one processor, the long duration defeasement portfolio comprising:
      matching, by the at least one computer, a synthetic duration of the long duration defeasement portfolio to a liability duration of at least one long duration liability; comprising:
         changing, by the at least one computer, the long duration defeasement portfolio, in a highly correlated manner, when a present value of said at least one long duration liability changes, aligning, by the at least one computer, a net asset value of the long duration defeasement portfolio with the present value of the long duration liability, wherein the long duration defeasement portfolio comprises at least one of bonds or derivatives having the same duration as said liability duration, wherein said liability duration is longer than the longest available separate trading of registered interest and principal of securities (STRIPs) bond, available from an applicable sovereign; and
      tracking, by the at least one computer, effective yields generated from the long duration defeasement portfolio, wherein said effective yields are at least one of greater than zero, or greater than effective yields of a zero-coupon bond that has a maximum available maturity closest to a maturity of the at least one long duration liability.

10. A computer implemented method of maintaining a long duration defeasement portfolio comprising:
    defeasing, by at least one computer, at least one long duration liability using at least one fixed income instrument in a long duration defeasement portfolio whose duration matches a liability duration of the at least one long duration liability, wherein said duration of said at least one fixed income instrument in said long duration defeasement portfolio exceeds a duration of the longest duration available separate trading of registered interest and principal of securities bond, available from an applicable sovereign, wherein said defeasing comprises:

aligning, by the at least one computer, a net asset value of the long duration defeasement portfolio with a present value of the at least one long duration liability; wherein said aligning comprises:

matching, by the at least one computer, a synthetic duration of said long duration defeasement portfolio to a liability duration of a long duration liability, wherein said liability duration of said long duration liability is greater than a duration of a longest available bond issued by an applicable sovereign; and changing, by the at least one computer, said long duration defeasement portfolio in a highly correlated manner when the present value of said long duration liability changes; and tracking, by the at least one computer, effective yields generated from the at least one fixed income instrument of said long duration defeasement portfolio, wherein said effective yields are at least one of greater than zero, or greater than effective yields of a zero-coupon bond that has a maximum available maturity closest to a maturity of the at least one long duration liability.

11. The method according to claim 1, wherein said portfolio comprises a synthetic security.

12. The method according to claim 1, wherein said portfolio comprises an inflation-adjusted security.

13. The method according to claim 1, wherein said portfolio comprises a synthetic ultralong inflation-protected separate trading of interest and principal security of duration that exceeds a longest available inflation-protected security available from an applicable sovereign.

14. The method according to claim 1, wherein said aligning comprises at least one of:

changing said long duration defeasement portfolio by at least one of:

using leverage to purchase or sell at least one security in the long duration defeasement portfolio;

purchasing or selling zero coupon bonds; or hedging interest rate risk for the long duration liability.

15. The method according to claim 6, wherein said aligning comprises at least one of:

changing said long duration defeasement portfolio by at least one of:

using leverage to purchase or sell at least one security in the long duration defeasement portfolio;

purchasing or selling zero coupon bonds; or hedging interest rate risk for the long duration liability.

16. The method according to claim 9, wherein said aligning comprises at least one of:

changing said long duration defeasement portfolio by at least one of:

using leverage to purchase or sell at least one security in the long duration defeasement portfolio;

purchasing or selling zero coupon bonds; or hedging interest rate risk for the long duration liability.

17. The method according to claim 10, wherein said aligning comprises at least one of:

changing said long duration defeasement portfolio by at least one of:

using leverage to purchase or sell at least one security in the long duration defeasement portfolio;

purchasing or selling zero coupon bonds; or hedging interest rate risk for the long duration liability.

* * * * *